(12) United States Patent
Gohil

(10) Patent No.: US 7,072,248 B2
(45) Date of Patent: Jul. 4, 2006

(54) RAPIDLY LOW TEMPERATURE CURABLE HIGH GAS BARRIER COATING

(75) Inventor: Rameshchandra M. Gohil, Newark, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 293 days.

(21) Appl. No.: 10/658,222

(22) Filed: Sep. 8, 2003

(65) Prior Publication Data
US 2004/0087696 A1 May 6, 2004

Related U.S. Application Data

(60) Provisional application No. 60/409,173, filed on Sep. 9, 2002.

(51) Int. Cl.
| | |
|---|---|
| *G04F 8/00* | (2006.01) |
| *G01K 1/02* | (2006.01) |
| *G01K 3/00* | (2006.01) |
| *C08K 3/34* | (2006.01) |

(52) U.S. Cl. .................. 368/327; 116/216; 374/102; 374/162; 524/404; 524/445; 524/446

(58) Field of Classification Search ............... 368/327; 116/216; 374/102, 162; 524/404, 445–447
See application file for complete search history.

(56) References Cited

U.S. PATENT DOCUMENTS

| | | | |
|---|---|---|---|
| 3,516,960 A | 6/1970 | Martins et al. | |
| 5,700,560 A | 12/1997 | Kotani et al. | |
| 5,840,825 A | 11/1998 | Carlblom et al. | |
| 6,444,751 B1 * | 9/2002 | Chujo et al. | 525/61 |
| 6,596,807 B1 * | 7/2003 | Oshita et al. | 524/557 |
| 2002/0055579 A1 * | 5/2002 | Oshita et al. | 524/445 |
| 2002/0197480 A1 * | 12/2002 | Umekawa et al. | 428/413 |

FOREIGN PATENT DOCUMENTS

| | | |
|---|---|---|
| EP | 0 805 177 | 11/1997 |
| EP | 1 176 155 | 1/2002 |
| JP | 11-182306 | 7/1999 |
| WO | WO 98/56861 | 12/1998 |
| WO | WO 00/49072 | 8/2000 |

* cited by examiner

*Primary Examiner*—Vit W. Miska

(57) ABSTRACT

Disclosed herein is a barrier coating that shows decreased moisture sensitivity compared to conventional coatings, and provides high barrier properties, as well as a rapid method for producing the coating. These improvements are generated through use of a boric acid chelating agent in the composition and curing the composition with UV/NIR radiation.

28 Claims, No Drawings

RAPIDLY LOW TEMPERATURE CURABLE HIGH GAS BARRIER COATING

RELATED U.S. APPLICATION DATA

This application claims the benefit of U.S. Provisional Application No. 60/409,173 filed Sep. 9, 2002.

FIELD OF THE INVENTION

Disclosed is an improved low temperature water-borne gas barrier coating composition which is curable with UV/NIR radiation, wherein the improvement comprises use of a boric acid chelating agent in the composition. The invention also concerns a method for decreasing the permeability of a polymeric substrate by use of the barrier coating. The coating and method are useful for making polymeric films and shaped objects.

TECHNICAL BACKGROUND OF THE INVENTION

Crosslinked, polymeric oxygen barrier coatings for containers, known in the art, require long thermal curing and are sensitive to humidity.

PCT patent application WO 00/49072, for example, describes a coating system for films and rigid containers, especially for injection stretch blow molded poly(ethylene terephthalate) (PET) bottles, which dramatically improves gas barrier performance over uncoated PET. The gas barrier coating layer is formed from a water-borne composition which contains at least 2% by weight solids. The solids portion of the water-borne barrier composition contains generally from 10% up to less than 90% by wt. of an inorganic laminar mineral and from greater than 10% by wt. up to less than 90% by wt. of a water-soluble or water-dispersible film forming organic binder. This binder optionally contains a catalyst and one or more crosslinking agents. While the disclosed coating provides enhanced barrier to gas transport, the time required to cure the binder thermally is long. The barrier coating is also sensitive to moisture, such that barrier properties are degraded at high humidity, above 50% relative humidity. Thus, both a rapid binder curing process and lessened coating moisture sensitivity are needed for practical application.

Patent application JP2789705 describes a barrier coating formulation for biaxially oriented films. It includes a silyl-group-containing modified poly(vinyl alcohol) and synthetic hectorite at a 50:50 weight ratio, dried and then heat-treated at 130 to 150° C. This cure temperature is too high for PET bottles to maintain their shape.

U.S. Pat. No. 5,700,560 discloses a coating formulation containing platy clay and polymer, as well as zirconium catalyst. A curing temperature above 100° C. precludes this coating from being suitable for PET bottles.

PCT patent application WO 98/56861 discloses a coating formulation of platy clay and water soluble polymers, such as poly(vinyl alcohol), with glucose as a plasticizer. The oxygen transmission rate (OTR) of poly(vinyl alcohol) is known to degrade at high humidity (see, e.g., U.S. Pat. No. 3,516,960), and there is no indication that these coatings are any less moisture sensitive.

European Patent Application 805,177 discloses a coating formulation, for biaxially oriented films, comprising platy clay, water-soluble polymer, and an amine compound. Curing is done above 95° C., making its use for PET bottles doubtful.

U.S. Pat. No. 5,840,825 discloses a coating formulation comprising platy clay and polymers, specifically, polyamine and polyepoxide. Curing is done at 63° C. for thirty minutes, which is a long time for an economically viable, high volume process.

Japanese Patent Application 11-182306 discloses a gas barrier film coated with a formulation comprising an inorganic layer-like compound (for example, montmorillonite clay), polyvinyl alcohol, and boric acid. The addition of boric acid resulted in a barrier improvement of about 2 to 3×. After samples were stored at 40° C., 90% RH for a month, barrier deteriorated by about the same relative amount whether or not boric acid was present, in spite of the crosslinking of the polyvinyl alcohol by the boric acid; that is, samples with coatings containing boric acid that had been stored at 40° C., 90% RH also exhibited about 2 to 3× better barrier than samples without boric acid that had been stored at 40° C., 90% RH.

A need therefore still exists for a high barrier coating formulation for PET containers and other polymeric substrates where the coatings have barrier properties that are insensitive to humidity. There is a further need for a curing system in such a barrier formulation that can be cured rapidly, preferably at low temperature.

The present invention relates to an improved water-borne gas barrier coating composition for polymeric substrates such as films, sheet, tubing and rigid, i.e., shaped, containers, and, more particularly, to an improved organic binder system for such a barrier coating system which includes a laminar layer mineral in a gas barrier layer, wherein the organic binder system exhibits lessened sensitivity to moisture and decreased curing time relative to prior art.

SUMMARY OF THE INVENTION

Disclosed is a barrier coating that shows decreased moisture sensitivity compared to conventional coatings, and provides high barrier properties, as well as a rapid method for producing the coating. These improvements are generated through use of a boric acid chelating agent and curing with UV/NIR radiation.

Specifically, the high-barrier, moisture insensitive coating herein contains at least 2% by weight solids in water, wherein the solids portion of the composition comprises:

a. from 25 to 55% by weight, a nonpolymeric organic binder comprising at least one member selected from the group consisting of melamine, formaldehyde, derivatives of melamine, and derivatives of formaldehyde, where such derivatives are capable of chelation with boric acid;

b. optionally, a water-soluble or water dispersible organic binder, selected from the group consisting of
  i) polysaccharides and cellulosic materials selected from the group consisting of cellulose, hydroxymethyl cellulose, carboxymethyl cellulose, amylose, pluran, starch, and hydroxyethyl cellulose;
  ii) water-soluble ethylene-vinyl alcohol (EVOH) copolymers;
  iii) water-soluble polyamides;
  iv) melamine formaldehyde resin;
  v) polyethylene glycol; and
  vi) blends thereof;

c. from 10% up to 70% by weight, based on the dry weight of the first coating layer, an inorganic laminar mineral selected from montmorillonite, laponite, organo-modified montmorillonite and mixtures thereof;

d. from 2 to 12% by weight, based on the dry weight of the first coating layer, boric acid; and e. from 0 to 6% by weight, based on the dry weight of the first coating layer, of a hydroxyl-containing species, other than poly(vinyl alcohol), that has two hydroxyl groups on one side of the molecule with which the boric acid can form a chelate.

Another embodiment of the invention is a polymeric container for foods and beverages which comprises:

1. a polymeric substrate shaped to define a container for a food or beverage;
2. a first coating layer adhered to at least one surface of the polymeric substrate and capable of retarding the transmission of oxygen and carbon dioxide through the substrate, said first coating layer comprising:
   a) from 25 to 55% by weight, a nonpolymeric organic binder comprising at least one member selected from the group consisting of melamine, formaldehyde, derivatives of melamine, and derivatives of formaldehyde, where such derivatives are capable of chelation with boric acid;
   b) optionally, a water-soluble or water dispersible organic binder, selected from the group consisting of
      i) polysaccharides and cellulosic materials selected from the group consisting cellulose, hydroxymethyl cellulose, carboxymethyl cellulose, amylose, pluran, starch, and hydroxyethyl cellulose;
      ii) water-soluble ethylene-vinyl alcohol (EVOH) copolymers;
      iii) water-soluble polyamides;
      iv) melamine formaldehyde resin;
      v) polyethylene glycol; and
      vi) blends thereof;
   c) from 10% up to 70% by weight, based on the dry weight of the first coating layer, an inorganic laminar mineral selected from the group consisting of montmorillonite, laponite, organo-modified montmorillonite and mixtures thereof; and
   d) from 2 to 12% by weight, based on the dry weight of the first coating layer, boric acid;
   e) from 0 to 6% by weight, based on the dry weight of the first coating layer, of a hydroxyl-containing species, other than poly(vinyl alcohol), that has two hydroxyl groups on one side of the molecule with which the boric acid can form a chelate; and
3. an optional clear coat layer adhered to the first coating layer which comprises a curable composition comprising a binder component in an organic solvent.

A further embodiment of the invention is a method for decreasing the permeability of a polymeric substrate, comprising the steps of:

1. forming the polymeric substrate;
2. optionally, heating the polymeric substrate surface before applying a first coating layer;
3. optionally, preheating an aqueous composition that will be used to form said first coating layer;
4. applying to at least one surface of the polymeric substrate said first coating layer having a thickness in the range of 8 microns or less by spraying or dip coating onto the polymeric substrate said aqueous composition comprising
   a) from 25 to 55% by weight, a nonpolymeric organic binder comprising at least one member selected from the group consisting of melamine, formaldehyde, derivatives of melamine, and derivatives of formaldehyde, where such derivatives are capable of chelation with boric acid;
   b) optionally, a water-soluble or water dispersible organic binder, selected from the group consisting of
      i) polysaccharides and cellulosic materials selected from cellulose, hydroxymethyl cellulose, carboxymethyl cellulose, amylose, pluran, starch, and hydroxyethyl cellulose;
      ii) water-soluble ethylene- vinyl alcohol (EVOH) copolymers;
      iii) melamine formaldehyde resin;
      iv) water-soluble polyamides;
      v) polyethylene glycol; and
      vi) blends thereof;
   c) from 10% up to 70% by weight, based on the dry weight of the first coating layer, an inorganic laminar mineral selected from the group consisting of montmorillonite, laponite, organo-modified montmorillonite and mixtures thereof; and
   d) from 2 to 12% by weight, based on the dry weight of the first coating layer, boric acid; and
   e) from 0 to 6% by weight, based on the dry weight of the first coating layer, of a hydroxyl-containing species, other than poly(vinyl alcohol), that has two hydroxyl groups on one side of the molecule with which the boric acid can form a chelate;
5. drying the first coating layer at ambient or slightly elevated temperature;
6. curing it at a temperature below the temperature at which heat distortion of the polymeric substrate can occur;
7. optionally, applying to the first coating layer a second coating layer having a thickness in the range of about 12 microns or less by spraying onto said first coating layer a curable composition comprising (a) a binder component and (b) an organic solvent; and curing said second coating layer.

The curing step (6) can be carried out thermally or by exposing the article to a lamp that emits ultraviolet (UV) and near infrared (NIR) radiation of sufficient power to effect the curing.

Also disclosed is a laminate comprising at least two layers, at least one of which comprises the coating composition described above. Further disclosed is a display device comprising at least one layer that is coated with the coating composition described above.

The invention is particularly well suited for improving the gas barrier performance of poly(ethylene terephthalate) ('PET') films, sheeting, and rigid containers used, for example, for packaging foods and beverages, and especially injection stretch blow molded PET bottles used for packaging carbonated soft drinks and beer.

The invention is also well-suited to be used as an oxygen barrier layer in multilayer laminates used in the electronics industry, for example, in display devices.

DETAILED DESCRIPTION OF THE INVENTION

The invention is a moisture-insensitive, high-barrier coating system for polymeric films, sheet, tubing, and rigid, i.e., shaped or molded, containers, especially bottles, produced from conventional polymeric materials and comprises a first coating layer based on a water-borne composition and an optional second, substantially clear coating layer based on a two-component solvent/binder composition. A preferred embodiment of the invention is a dual coating layer system applied to either a polymeric film or the exterior surface of a rigid container, particularly an injection stretch blow molded biaxially oriented polyester container, to achieve substantially increased resistance to permeation by oxygen and carbon dioxide, e.g., up to 20 times or more resistance to permeation vs. a polymeric film or container without the coating system. The coating compositions, moreover, can be applied economically to films, containers, tubing, or laminates by any convenient spray application method. The coating compositions can also be applied to the interior of containers and tubing by any convenient method. PET films and containers having the first barrier coating layer typically exhibit for a given polymeric film thickness, based on test samples cut from container side walls, an Oxygen Permeation Value, which is one means for determining and comparing gas barrier performance in the range of about 0.7 $cm^3$ mil/100 $in^2$-day-atm or less even at 80% RH. In some applications, the Oxygen Permeation Value can be as low as 0.07 $cm^3$ mil/100 $in^2$-day-atm, and even lower, e.g., in the range of 0.03 $cm^3$ mil/100 $in^2$-day-atm. The substantially clear overcoat operates to protect the first barrier coating layer from deterioration, degradation, etc. during use.

By "nonpolymeric" herein is meant low molecular weight, that is, including from one up to about ten repeat units.

The boric acid forms a chelate with the nonpolymeric binder, so that the coating, when cured, is much less soluble in water than in the absence of boric acid and curing. Cure time and temperature are also reduced.

The boric acid is optionally added along with a hydroxyl-containing species that has two hydroxyl groups on one side of the molecule with which the boric acid can form a chelate. Non-limiting examples of such hydroxyl-containing species include mannitol and sorbitol.

The optional water-dispersible organic binder is used to improve coating mechanical properties, such as flexibility.

The coating formulation can be cured thermally, for a time period of minutes to hours, depending on the specific composition and temperature. Some of the compositions disclosed below are cured at room temperature in a few days. Very rapid curing (for example, in less than one minute) is obtained by exposing the coating to a lamp emitting a combination of ultraviolet (UV) and near infrared (NIR) radiation.

Spray application of the coating composition produces a generally uniform first coating layer having a dry thickness of up to 20 microns, although in practice excellent barrier properties have been observed with relatively thin coating layers in the range of only 3 to 4 microns in thickness. The mineral platelets become oriented within the organic binder portion of the dry coating layer in a generally parallel three-dimensional and overlapping spaced relationship. Depending on the application, a shaped plastic container having a first coating layer for gas barrier properties, for example, can also include a second substantially clear coating layer adhered to the first coating layer. The second coating layer comprises a curable composition comprising (a) a binder component in (b) an organic solvent. Suitable binder components and organic solvents are described in PCT patent application WO 00/49072, herein incorporated by reference.

Polymeric Substrate

The gas barrier coating system of the invention can be applied to practically any thermoplastic polymeric surface. Films, sheeting, rigid containers, bottles, tubing, and laminates contemplated for use according to the invention include, but are not limited to, those formed from conventional thermoplastic polymers, such as polyolefins, polyamides, and engineering polymers, such as polycarbonates, and the like. The invention is particularly applicable to films and rigid, i.e., shaped, containers, and especially injection stretch blow molded biaxially oriented hollow thermoplastic containers, such as bottles, formed from synthetic linear polyesters, such as polyethylene terephthalate, polybutylene terephthalate, polyethylene naphthalate, and the like, including homopolymers and copolymers of ethylene terephthalate and ethylene naphthalate wherein up to about 50 mole percent or more of the copolymer can be prepared from the monomer units of diethylene glycol; propane-1,3-diol; butane-1,4-diol; polytetramethylene glycol; polyethylene glycol; isosorbide; polypropylene glycol and 1,4-hydroxymethylcyclohexane substituted for the glycol moiety in the preparation of the copolymer; or isophthalic, dibenzoic; naphthalene 1,4- or 2,6-dicarboxylic; adipic; sebacic; and decane-1,10-dicarboxylic acid substituted for the acid moiety in the preparation of the copolymer.

The present invention can also be used to produce high-barrier plastic containers for applications that currently employ metal, such as aerosol containers and coffee cans. The plastic aerosol container should have a volume greater than about 240 ml. Such containers would combine light weight and transparency with long shelf life.

Laminated films of the present invention are also useful for the construction of indicating devices and sensors, particularly time and temperature-time indicators based on indicating materials whose color changes in the presence of a substance that continuously permeates into the package, e.g., oxygen or water vapor. Such an indicator is based on the principle that the rate at which a substance permeates into a package will depend both on the temperature and the time elapsed since the package was initially exposed to the permeating substance. For example, U.S. Pat. No. 3,768,976 discloses a temperature-time integrating device based on oxygen permeation rate, wherein the indicator comprises a transparent film package containing a warning message enclosed in the package together with an aqueous solution of a redox dye. The dye is dark red in its reduced state and colorless when oxidized. Thus, once a sufficient amount of oxygen has permeated through the film, the dye is oxidized and the warning message becomes visible. The amount of oxygen present in the film package depends on temperature and the amount of time that has elapsed. Thus, such a device can be used to indicate when the shelf life of a food product, or other material which is subject to deterioration over time, has been reached.

Similarly, if water vapor is deleterious to a product, an indicating device could be designed based on the rate of water vapor permeation through a film package containing a substance that changes color based on atmospheric humidity, such as cobalt(II) chloride, which is blue in its anhydrous state and pink when hydrated. To indicate a shelf life of, for example, six months, a very high barrier material is desired so as to minimize both the oxygen permeation rate and the needed concentration of costly indicator dye. The laminated films of the present invention are suitable for this purpose. Particularly useful laminates are those comprising at least three layers, wherein at least one inner layer comprises the coating composition of the present invention and at least one of the outermost layers comprises a heat sealable polymer film.

Since the present invention includes formulations that are cured in a few days at room temperature, it can be used to make high barrier containers from inexpensive polyolefins. It can also be as a barrier coating for films and tubes of low-melting inexpensive polymers for other applications, for example, display systems made with organic light emitting diodes.

The foregoing description is intended to be an illustration of applicable polymeric substrates and not by way of a limitation on the scope of the invention.

First Coating Layer

Laminar Mineral Component

The first coating layer, i.e., the gas barrier coating layer, is formed from a water-borne composition which contains at least 2% by weight solids. Water is the primary carrier or solvent for the solids component of the barrier composition, although the composition may optionally contain a small amount, e.g., not more than about 10% by wt. based on the total amount of solvent, of a suitable co-solvent. The solids portion of the water-borne barrier composition contains generally from 10% up to less than 90% by wt., based on the weight of the first coating layer after drying/curing, of an inorganic laminar mineral selected from phyllosilicates, and particularly montmorillonite, laponite, organo-modified montmorillonite and mixtures thereof. "Organo-modified montmorillonite" is used herein to describe a clay material whereby an organic moiety has been strongly attached to the clay platelet by a treatment of subjecting the clay to an ion exchange process whereby interlammelar inorganic cations present in the clay are replaced by organic cations comprising, but not limited to, either an organic group bonded to a cationic salt group, such as quaternary ammonium, phosphonium, pyridinium, or the like, or an organic compound containing a cationic amine salt group.

The laminar minerals are available commercially and comprise platelets which can have a thickness of from 10 to 60 Ångstroms and an aspect ratio, i.e., the ratio of the maximum width of a platelet to its thickness, of typically greater than 150. More detailed information on the composition and structure of phyllosillicate layer minerals can be found in "Clay Minerals: Their Structure, Behaviour & Use", Proceedings of a Royal Society Discussion Meeting, 9 and 10 Nov. 1983, London, The Royal Society, 1984.

Commercially available montmorillonite platelets will have length and width dimensions which can both range from 150 to 250 nm, and commercially available laponite platelets will have length and width dimensions which can both range from 2 to 20 nm up to 20 to 200 nm. Platelet thickness will generally be in the range of 1 nm. Laminar minerals having lower levels of impurities, such as, for example, quartz, silica, mica, etc., are preferred over other commercial grades of laminar minerals for their improved barrier performance in use.

Chelating Agents

The use of chelating agents to enhance water resistance as well as oxygen barrier is a key feature of the present invention. The tetrahedral monoborate ion can react with diols and polyols in aqueous solution to form chelates [see, for example, Richard P. Oertel, Inorganic Chemistry, Vol. 11, No. 3, p.544 (1972)]. In the present invention, the nonpolymeric organic binder is made more hydrophobic through chelation with a tetrahedral monoborate ion. The source of the tetrahedral monoborate ion is boric acid, preferably at a concentration ranging from 2 to 12 wt %, based on the dry weight of the first coating layer. The acidity of the boric acid can be desirably increased by adding from 0 to 6% by weight, based on the dry weight of the first coating layer, of a hydroxyl-containing species, other than poly(vinyl alcohol), that has two hydroxyl groups on one side of the molecule with which the boric acid can form a chelate.

Non-limiting examples of suitable hydroxyl-containing species are mannitol and sorbitol. A preferred ratio of boric acid to hydroxyl-containing species is 1:1. High levels of boric acid can increase the brittleness of the coating layer. Thus, a particularly preferred first coating layer includes 5% boric acid and 5% mannitol (based on dry weight), to maximize the efficacy of the boric acid while minimizing brittleness development. Surprisingly, the complex formed does not change the viscosity appreciably and does not precipitate out immediately in dilute aqueous solution of our formulation. This higher than expected solution pot life allows us to spray the solution onto films and bottles.

Nonpolymeric Organic Binder

The solids portion of the barrier layer includes from 25 to 55% by weight, a nonpolymeric organic binder comprising at least one member of the group consisting of melamine, formaldehyde, derivatives of melamine, and derivatives of formaldehyde, where such derivatives are capable of chelation with boric acid. This complexes with boric acid in the present invention, resulting in faster cure at lower temperature and formation of a moisture-resistant coating.

Particularly preferred are binders made from melamine and formaldehyde, for example, the dimer Cymel® 385 made by Cyrtec Ind.

Structure of Cymel® 385 dimer

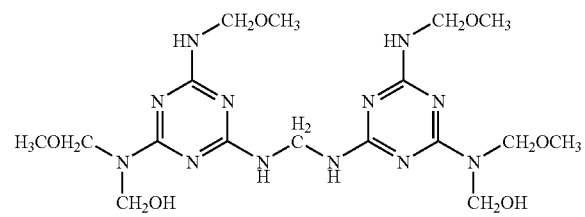

Organic Binder

The solids portion of the water-borne barrier composition optionally includes a water-soluble or water-dispersible film-forming organic binder selected from the group consisting of:

i) polysaccharides and cellulosic materials selected from cellulose, hydroxymethyl cellulose, carboxymethyl cellulose, amylose, pluran, starch, and hydroxyethyl cellulose, and the like which are synthesized by condensation polymerization of monosaccharides;

ii) water-soluble ethylene- vinyl alcohol (EVOH) copolymers;

a. melamine formaldehyde resin;

b. water-soluble polyamides;

c. polyethylene glycol; and d. blends thereof.

The water soluble or water dispersible organic binder described above optionally contains a catalyst selected from sulfonic acids, amines, and tin catalysts. The binder can be added to improve mechanical properties of the coating, such as flexibility, Other Additives In addition, the water-borne binder composition of the invention may contain a variety of other optional ingredients, including pigments, pearlescent flakes, plasticizers, antioxidants, surfactants and flow control agents. The binder composition may also contain a co-solvent of the type which can be used in water borne compositions, such as isopropanol, butanol, butyl cellosolve, propylene glycol monoethyl ether, propylene glycol monomethyl ether acetate and others.

To improve weatherability of a first coating layer produced from the barrier coating composition of the invention, an ultraviolet light stabilizer or a combination of ultraviolet light stabilizers can be added in the amount of from about 0.1 to 5% by wt., based on the weight of the binder. Such stabilizers include ultraviolet light absorbers, screeners, quenchers, and specific hindered amine light stabilizers and are typically selected from benzophenones, triazoles, triazines, benzoates, hindered amines and mixtures thereof. An antioxidant can also be added in an amount from about 0.1 to 5% by wt., based on the weight of the binder.

The composition may also include other formulation additives, such as thickeners, e.g., Acrylsol® copolymers (Rohm & Haas); pigments; dispersants, e.g., sodium tripolyphosphate; and surfactants to assist wetting out of the water-borne coating composition during spray application e.g., nonyl phenyl ethoxylate, such as NP10 or NP8; or a fluorosurfactant, e.g., Zonyl® fluorosurfactant (E. I. du Pont de Nemours and Company, Wilmington, Del.).

A water-borne system is critical for achieving optimum gas barrier performance from the barrier composition of the invention. Water, even in the presence of up to about 10% by wt., based on total weight of solvent, of a co-solvent, influences exfoliation of the individual laminar mineral platelets and allows their free movement and orientation within the composition. When the barrier composition is applied to a polymeric substrate, e.g., the exterior surface of a blow molded PET bottle, via any convenient spray application technique and is then heated (e.g., at a temperature in the range of from 60 to 70° C. for from 10 to 15 minutes), it will form a dry first coating layer typically having a film thickness in the range of 20 microns, but more typically in the range of 8 microns or less. The individual mineral platelets will have oriented themselves and become fixed within the cured organic binder layer in a generally parallel three-dimensional and over-lapping spaced relationship. The gas barrier performance of a polymeric substrate coated in this manner is from 20 to 30 times or more greater, when compared, for example, by respective Oxygen Transport Rates, than the substrate alone.

In a preferred embodiment of the invention, the water-borne barrier coating composition comprises montmorillonite as the inorganic laminar mineral in the form of platelets having an aspect ratio of from 20 to 500 and an average particle size of less than 5 microns. (e.g., Montmorillonite Mineral Colloid MO available from Southern Clay Products, Inc., Texas, USA) The preferred nonpolymeric organic binder for the first coating layer based on observed barrier performance is a melamine formaldehyde dimer, available as Cymel® 385 from Cytec Industries (West Paterson, N.J.). The preferred chelating agent is a 1:1 by weight mixture boric acid and d-mannitol. A particularly preferred first coating layer of the barrier composition will contain (based on dry weight) 50% w/w montmorillonite clay, 10% w/w chelating agent (1:1 mixture of boric acid and d-mannitol), and 40% w/w Cymel® 385.

Optional Second Coating Layer: Clear Coat

For some applications, it may be desirable to employ a two-layer barrier coating system wherein a second coating layer is applied which is a solvent based two component clear coat which comprises (a) from 20 to 80% by wt. of an organic solvent and (b) from 80 to 20% by wt. of a binder component. A clear coat second coating layer imparts water resistance, impact resistance, hardness, mar resistance, appearance qualities (gloss and distinctness of image) and clarity, i.e., key performance properties, to the overall gas barrier coating system. It also insures more consistent overall performance.

The binder component of the second clear coat composition can be an epoxy/amine cross-linked system or an epoxy/acid cross-linked system. Preferably, the binder component of the second clear coat composition is a system which includes a hydroxyl component with a cross-linking component, and is selected from the group consisting of:

I. (a) acrylic polymers which contain at least two functional hydroxyl groups and are derived from acrylates, methacrylates, styrene, and hydroxyl functional monomers of such acrylates, said acrylic polymers having a weight average molecular weight of between 3,000 and 50,000;

(b) polyester resins having at least two functional hydroxyl groups and a weight average molecular weight of from 1000 to 15,000;

(c) polyester urethanes and acrylo-urethanes having at least two functional hydroxyl groups;

(d) hydroxyl functional linear or branched cycloaliphatic moiety-containing reactive oligomers or a blend of such oligomers; and II. aliphatic or aromatic isocyanates having at least two functional isocyanate groups where the ratio of isocyanate to hydroxyl functionality is from 0.5 to 3.0, based on equivalents.

The organic solvent component of the second coating layer is selected from the group consisting of aromatic hydrocarbons selected from petroleum naphtha and xylenes; ketones selected from methyl amyl ketone, methyl isobutyl ketone, methyl ethyl ketone and acetone; esters selected from butyl acetate and hexyl acetate, and glycol ether esters.

The hydroxyl component of the binder may include a linear or branched cycloaliphatic moiety-containing reactive oligomer or a blend of such oligomers. The reactive oligomer is provided with a GPC weight average molecular weight not exceeding about 3000, but preferably in the range of from 500 to 1200.

The hydroxyl component of the binder for the second clear coat composition may be blended with non-alicyclic (linear or aromatic) oligomers, if desired. Such non-alicyclic-oligomers may be made using non-alicyclic anhydrides, such as succinic or phthalic anhydrides, or mixtures thereof. Caprolactone oligomers may be also used.

The acrylic polymer component of the second layer has a GPC weight average molecular weight above 3000, and preferably in the range of from 8000 to 12,000. The $T_g$ of the acrylic polymer will vary generally in the range of from 0° C. to 100° C., but may be higher or lower. The acrylic polymer may be any conventional solvent-soluble acrylic polymer conventionally polymerized from typical monomers, such as alkyl (meth)acrylates having alkyl carbon atoms in the range of from 1 to 18, and styrene and functional monomers, such as, hydroxy ethyl acrylate and hydroxy ethyl methacrylate.

In addition to the foregoing polymers, the hydroxyl component of the clear coat binder may further contain up to 40% by wt., based on the total weight of the binder, of a dispersed acrylic polymer which is a polymer particle dispersed in an organic media, wherein the polymer particle is emulsion stabilized by what is known as steric stabilization, and the polymer particle is provided with a core having macromonomer chains or arms attached to it. The average particle size of the core is in the range of from 0.1 to 0.5 microns.

The dispersed acrylic polymer includes in the range of from about 10% by wt. to 90% by wt., based on the weight of the dispersed polymer, of a core formed from high molecular weight polymer having a weight average molecular weight of about 50,000 to 500,000. The arms make up about 10% by wt. to 90% by wt., based on the weight of the dispersed polymer. The arms are formed from a low molecular weight polymer having weight average molecular weight in the range of from 3000 to 15,000.

The core of the dispersed acrylic polymer is comprised of polymerized acrylic monomer(s) optionally copolymerized with ethylenically unsaturated monomer(s). Suitable monomers include styrene, alkyl (meth)acrylate having alkyl carbon atoms in the range of from 1 to 18; ethylenically unsaturated monocarboxylic acid, such as, (meth)acrylic acid, and silane-containing monomers. Other optional monomers include hydroxyalkyl (meth)acrylate or acrylonitrile. Optionally, the core may be crosslinked through the use of diacrylates or dimethacrylates, such as, allyl methacrylate or through post reaction of hydroxyl moieties with polyfunctional isocyanates.

The macromonomer arms attached to the core may be polymerized from monomers, such as alkyl (meth)acrylates having 1 to 12 carbon atoms. Typical hydroxy-containing monomers are hydroxy alkyl (meth)acrylates, described above.

The hydroxyl binder may also include a polyester which has a GPC weight average molecular weight greater 1500, but preferably in the range of from 2000 to 5000. The Tg of the polyester will vary in the range of from −50° C. to +100° C., but typically Tg will be in the range of from −20° C. to +50° C.

Polyesters suitable for use with the hydroxyl binder in the second clear coat composition of the present invention may be any conventional solvent soluble polyesters conventionally polymerized from suitable polyacids, including cycloaliphatic polycarboxylic acids, and suitable polyols, which include polyhydric alcohols. Examples of suitable cycloaliphatic polycarboxylic acids are tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahyd rophthalic acid, camphoric acid, cyclohexanetetracarboxylic acid and cyclobutanetetracarboxylic acid. The cycloaliphatic polycarboxylic acids can be used not only in their cis but also in their trans form and as a mixture of both forms. Examples of suitable polycarboxylic acids, which, if desired, can be used together with the cycloaliphatic polycarboxylic acids, are aromatic and aliphatic polycarboxylic acids, such as, for example, phthalic acid, isophthalic acid, terephthalic acid, halogenophthalic acids, such as, tetrachloro- or tetrabromophthalic acid, adipic acid, glutaric acid, azelaic acid, sebacic acid, fumaric acid, maleic acid, trimellitic acid, and pyromellitic acid.

Suitable polyhydric alcohols include ethylene glycol, propanediols, butanediols, hexanediols, neopentylglycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, tris(hydroxyethyl) isocyanate, polyethylene glycol and polypropylene glycol. If desired, monohydric alcohols, such as, for example, butanol, octanol, lauryl alcohol, ethoxylated or propoxylated phenols may also be included along with polyhydric alcohols.

The second coating layer composition employs a cross-linking component which may include an oligomeric cross-linker or a blend thereof. The cross-linker is provided with at least two isocyanate groups such that the ratio of equivalents of isocyanate of the oligomeric cross-linker per equivalent of the hydroxyl of the hydroxyl component is in the range of from 0.5/1 to 3.0/1, but preferably in the range of from 0.8/1 to 1.3/1. Suitable oligomeric cross-linkers include aromatic, aliphatic, or cycloaliphatic isocyanates, trifunctional isocyanates and isocyanate functional adducts of a polyol and difunctional isocyanates. More specific isocyanates include diisocyanates such as 1,6-hexamethylene diisocyanate, isophorone diisocyanate, 4,4'-biphenylene diisocyanate, toluene diisocyanate, biscyclohexyl diisocyanate, tetramethylene xylene diisocyanate, ethyl ethylene diisocyanate, 1-methyltrimethylene diisocyanate, 1,3-phenylene diisocyanate, 1,5-napthalene diisocyanate, bis-(4-isocyanatocyclohexyl)-methane and 4,4'-diisocyanatodiphenyl ether.

Suitable trifunctional isocyanates include triphenylmethane triisocyanate, 1,3,5-benzene triisocyanate, and 2,4,6-toluene triisocyanate. Trimers of diisocyanate, such as the trimer of hexamethylene diisocyante available under the trademark Desmodur® N-3390 from Bayer Corporation, Pittsburgh, Pa. and the trimer of isophorone diisocyanate are also satisfactory. Furthermore, trifunctional adducts of triols and diisocyanates are also suitable. Trimers of diisocyanates are preferred and trimers of isophorone and hexamethylene diisocyantes are more preferred.

The cross-linking component may optionally include other cross-linkers of the type selected from aldimine oligomers, which are the reaction products of alkyl aldehydes, such as, isobutyraldehyde with diamines, such as isophorone diamine; ketimine oligomers, which are the reaction product of alkyl ketones, such as, methyl isobutyl ketone with diamines, such as 2-methyl pentamethylene diamine; and polyaspartic esters, which are the reaction product of diamines such as, isoperone diamine with dialkyl maleates such as, diethyl maleate. All of the foregoing additional cross-linkers are commercially available, such as, for example, those supplied under the trademark Desmophen® amine co-reactants by Bayer Corporation, Pittsburgh, Pa.

The cross-linking component of the binder preferably includes a catalytic amount of a catalyst for accelerating the curing process. Generally, the amount of catalyst needed for satisfactory results will be in the range of from about 0.001% by wt. to about 5% by wt., but preferably in the range of from 0.02% to 1% by wt., based on the total weight of binder solids in the composition. A wide variety of catalysts can be used, such as tin compounds, including dibutyl tin dilaurate; and tertiary amines, such as, triethylenediamine. These catalysts can be used alone or in conjunction with carboxylic acids, such as acetic acid. One of the preferred commercially available catalysts is marketed under the trademark, Fastcat® 4202 dibutyl tin dilaurate and is available from Elf-Atochem North America, Inc. Philadelphia, Pa.

The hydroxyl or cross-linking component of the binder of the second coating composition contains at least one organic solvent which is typically selected from the group consisting of aromatic hydrocarbons, such as petroleum naphtha or xylenes; ketones, such as methyl amyl ketone, methyl isobutyl ketone, methyl ethyl ketone or acetone; esters, such as butyl acetate or hexyl acetate; and glycol ether esters, such as propylene glycol monomethyl ether acetate. The amount of organic solvent employed depends upon the desired solids level as well as the desired amount of VOC of the composition. If desired, the organic solvent may be added to both components of the binder.

The second layer clear coat composition may also contain conventional additives, such as UV screeners and organic or inorganic pigments for tinting the otherwise clear coat for color, stabilizers, rheology control agents, flow control agents and toughening agents depending on the intended end use for the coated polymeric substrate. The foregoing additives may be added to either the hydroxyl or cross-linking component, or to both, depending upon the intended use for the coating composition.

Coating Application

Surface Pretreatment

In some cases, it may be desirable to pretreat the surface of the polymeric substrate to be coated to enhance adhesion of the first coating layer to the substrate and/or to improve wetting of the substrate by the coating composition. Thus, the instant invention includes the optional step of treating the surface of the container that will be receiving the coating composition with a means to improve surface adhesion characteristics whereby the coating composition will consistently and uniformly adhere to the substrate surface when it dries. Means or methods for surface pretreatment are conventional and include flame treating, application of a chemical mist, and by exposing the polymeric surface to a plasma for a predetermined period of time.

Preheating

Heating the coating formulation, then cooling it to back to room temperature, before applying it to the polymeric substrate dramatically reduces the time required for the first coating to become water resistant. Viscosity also remains appreciably unchanged, so application ease is not reduced. Preheating conditions of five to fifteen minutes at 75 to 90° C. have been used successfully. However, prolonged heating can impair the quality of the coating. Hence, it is necessary to adjust the heating time and temperature depending on the specific formulation used.

Application of Coating Compositions

The coating compositions of the invention can be applied to practically any polymeric substrate by any convenient spray method including air spraying or an electrostatically assisted spray application method including compressed air spray, mini bells, and discs. The coating compositions are also suitable for airless spray application, or by doctor blade and roller coat application, but spray application is preferred for obtaining optimum orientation of the mineral platelet particles within the applied barrier coating layer, and, thereby, optimum and consistent barrier performance. For applications which require only the first barrier coating layer, the coating is allowed to flash at ambient conditions for a short period of time, usually less than two minutes, during which time water can evaporate, and then the coated substrate is placed cured as described below.

For applications which require the two-coating layer system, the barrier layer is typically spray applied and allowed to dry at ambient temperature for two minutes or less. Evaporation of the water in the barrier layer can be accelerated using infrared lamps if desired. The solvent based clear coat is applied after flashing and/or curing the barrier layer (vide infra), and the two-layer system is then allowed to flash at ambient conditions for up to 2 minutes, after which the clear coat is cured.

Curing Processes

The curing of the first layer, making it water-resistant, can be carried out thermally or by exposing the article to ultraviolet/near infrared (UV/NIR) radiation of sufficient power to effect the curing. In thermal curing, the curing temperatures and curing times may vary widely and will depend on economics (i.e., cure time vs. temperature) and on the type of polymeric substrate being cured and the time over which it can withstand elevated temperatures without melting, distorting, or otherwise degrading. Typical oven curing temperatures for PET bottles are 60 to 80° C. As will be demonstrated in the non-limiting examples below, some compositions are curable in a few days at room temperature, and others are curable in a less than a minute when exposed to UV/NIR radiation of sufficient power.

UV lamps designed for use in chemical curing processes are known in the art. Such lamps inherently deliver NIR radiation as well, whence the denotation herein of "UV/NIR" to describe the radiation to which the sample is exposed. One example of a lamp that can be used in the present invention is the EPIQ 6000 Irradiator, Model 6000, made by Fusion UV Curing Systems™ (Rockville, Md.). The intensity of the UV radiation (200–450 nm) and NIR radiation (700–2500 nm) is determined through choice of bulb type, reflector (regular or dichroic), and a variable power supply.

Analytical Test Methods

Water Resistance

A one-inch wide strip of coated Mylar® PET film (DuPont Teijin Films, Hopewell, Va.) made by the DuPont Company, Wilmington, Del.) was mounted on a pre-heated one-inch wide Aluminum plate. When the sample was to be heated, the plate was re-inserted into a small opening in the rear of an air oven, which was maintained at the desired test temperature. If thermally cured, samples were heated in the oven for different periods of time, removed, allowed to cool to room temperature, and then tested for water resistance. The water resistance of coatings was determined by placing water droplets on various locations of the coated film. After 1 minute, each droplet was swiped using a soft tissue. If the coating was not removed, it was denoted water-resistant and thus cured.

Oxygen Permeability

Oxygen Transport Rate (OTR) measurements were carried out using the OX-TRAN® 2/60 Oxygen Transmission System, manufactured by MOCON, Inc. (Minneapolis, Minn.). Oxygen Permeability Value (OPV) for 1 mil Mylar® 92D PET films at 50% RH and 23.5° C. is 3.54 $cm^3$-mil/100 sq. inch-day-atm, while OTR of such film at 80% RH is 4.1 $cm^3$/100 sq. inch-day-atm. Barrier improvement was determined from the ratio of OPV value of non-coated samples to the OPV value of coated samples. The OTR measurements on PET bottles at 92% relative humidity (Examples 17 through 24) were done on the OX-TRAN® 2/60 using the standard package fixture (P/N 033-385). The relative humidity (RH) was controlled at 92% by first bubbling the oxygen through pure water and then through a saturated potassium nitrate solution. The RH of the nitrogen which flows through the inside of the bottle and then to the oxygen sensor, was maintained at 33% using a gas carrier humidifier (P/N 032-413). For bottles, Oxygen Transmission Rates (OTR) were determined as $cm^3$/package-day at 25° C., 92% RH.

The invention is illustrated in greater detail with reference to the Examples which follow; however, the invention is not to be limited by the Examples.

EXAMPLES

Preparation of Montmorillonite Clay Slurry/Water Slurry Master Batch for Films 2700 grams of deionized water was weighed out and poured into a 1-gallon metal bucket. 144 grams of montmorillonite clay was slowly added to the water while stirring with an air motor equipped with a 4 in. diameter high speed dispersion (HSD) blade. The addition took approximately 5 minutes, after which the slurry was stirred at high speed for 30 minutes. The clay/water master batch was stored in a 1-gallon polyethylene jug until use.

Before coating, the clay/water master batch was sheared in a Waring Blender at its highest speed setting for 5 minutes in order to achieve uniform dispersion of the clay. This procedure provided good coating quality.

Preparation of Montmorillonite Slurries for Spray Coating Bottles

In a 10 gal plastic bucket, 500 g of montmorillonite clay were slowly added to 8500 g of deionized water while mixed slowly with an 4 inch high speed dispersion (HSD) blade driven by an air motor. After the addition was completed, the slurry was stirred at high speed for 30 min.

For the Boric Acid/mannitol Experiments: 25.3 g boric acid were dissolved in 500 g of water. 74.7 g of d-mannitol were dissolved in 500 g of water. Both solutions were added to the clay slurry described above at low mixer speed. 506.5 g Cymel® 385 was added slowly to the slurry and the barrier coating was mixed at high low speed for 60 min.

For the Boric Acid Experiments: 50.6 g of boric acid were dissolved in 1000 g of water and the solution was added to the clay slurry described above at low mixer speed. 506.5 g Cymel® 385 was added slowly to the slurry and the barrier coating was mixed at high low speed for 60 min.

The material was passed twice through a supermill under the following conditions: Media (Zirconia), Media Size (0.6–0.8 microns), media load (1200 ml), 2 passes, flow rate (0.5 pt/min).

Coating Technique

In the film experiments below, Mylar® 92D PET film was used unless otherwise noted. Mylar® 92D film is a transparent, 1 mil PET film having a very smooth surface. PET films were coated by drawing down the clay/Cymel® slurry using a #50 wire wound applicator rod supplied by Paul N. Gardner Company, Inc. located in (Pompano Beach, Fla.). Appropriate wire gauge was selected so that coating thickness was in the range of 5–8 microns. Films were cured at 65° C. for a period of 15 minutes unless otherwise noted.

Bottles were spray coated using a modified Automatic Test Panel Spray Machine from Spraymation, Inc. (Fort Lauderdale, Fla.) in a 20 foot spray booth. An air-driven stirrer was mounted on the back of the spray machine. Freshly flame treated (two passes through a double rig using a gas/air mixture) PET bottles were mounted in a stainless steel jig which covered the cap area of the bottle and placed via a connector upside down on the air driven stirrer. The bottle was rotated at a rotation speed of ~500–750 rpm in a stationary position. Three AGXspray guns from DeVilbiss (Maumee, Ohio) equipped with a FF gun tip for the barrier coat and a FX gun tip for the clear coat were mounted on a manifold ~12 inches away from the object. The guns passed the rotating bottle with a speed of 800 inches per minute. The top gun was in a slightly downward tilted position, the middle gun was in a 90° angle to the bottom panel and the bottom gun was slightly tilted in an upward position. The bottles were rotating and the spray guns were all triggered at the same time while passing the bottle. The barrier coat was applied in one pass while the clear coat was applied in two spray passes with a 30 sec. flash time between the two passes. All three guns were fed out of the same pressure pot.

Clear Coat

The clear coat layer used to protect the base coat was Chromaclear® Ultra Productive Urethane. The components were Polyol (4500S, which contains a UV screener package), Isocyanate activator (4505S), and a solvent blend reducer (12375S). These components were mixed together in a 3:1:0.5 ratio respectively. The weights of 4500S and 4505S were critical, while the weight of the solvent reducer could be increased or decreased according to desired drying time. These chemicals were manufactured by DuPont and were supplied by DuPont Performance Coatings.

UV/NIR Irradiation of Samples

An EPIQ 6000 Irradiator, Model 6000 UV lamp, made by Fusion UV Curing Systems™ (Rockville, Md.), was used to irradiate samples. For irradiation of bottle surfaces, the UV radiation was focussed at a rotating bottle sample. Film samples were mounted on a specially made holder and allowed to pass through the UV/NIR chamber at a desired rate.

Example 1

Comparative

A 5 wt % montmorillonite clay/water slurry master batch was prepared as described above. The master batch was weighed into a jar and Cymel® 385 was then weighed into the jar to produce a concentration of 5 wt %. The resulting solution was stirred until homogeneous with a magnetic stirring bar at the fastest speed possible without creating bubbles.

The formulation was coated onto samples of Mylar® 92D PET film as described above. Samples were cured at 150, 178, and 200° C. and curing times were determined as described above. Results are summarized in Table 1.

Example 2

A 5 wt % montmorillonite clay/water slurry master batch was prepared as described above. The master batch was weighed into a jar and Cymel® 385 was weighed into the jar to produce a concentration of 4 wt %. The resulting solution was stirred until homogeneous with a magnetic stirring bar at the fastest speed possible without creating bubbles.

Enough boric acid to produce a concentration of 1 wt % in the solution was weighed out separately into a vial, dissolved in a minimal amount of deionized water, and added to the clay/water/Cymel® solution. The solution was stirred until homogeneous. Films were coated within one hour of the addition of boric acid to the solution.

Samples were cured at 80 and at 100° C. and the time required for the samples to become water-resistant, i.e., for curing to be complete, was determined as above. Results are summarized in Table 1. Note that this composition became water-resistant in 5 minutes at 100° C., while it was necessary to heat the sample coated with the standard formulation to 178° C. to achieve the same curing rate.

Example 3

A coating formulation was prepared as in Example 2, except that boric acid was added at a level of 1.5 wt % and the Cymel® 385 concentration was 3.5 wt %. Mylar® 92D film samples were coated with this formulation as described above. Samples were cured at 80 and at 100° C., and the time required for the samples to become water-resistant, i.e., for curing to be complete, was determined as above. Results are summarized in Table 1. The curing time at 100° C. was 2 minutes with 1.5 wt % boric acid versus 5 minutes at 1 wt % boric acid in Example 2.

Example 4

A 5 wt % montmorillonite clay/water slurry master batch was prepared as described above. The master batch was weighed into a jar and Cymel(® 385 was weighed into the jar to produce a concentration of 4 wt %. The resulting solution was stirred until homogeneous with a magnetic stirring bar at the fastest speed possible without creating bubbles. Enough d-mannitol to produce a concentration of 0.5 wt % in the solution was weighed out separately into a vial, dissolved in a minimal amount of deionized water, and added to the clay/water/Cymel® solution. The solution was stirred until it was homogeneous. Then enough boric acid to produce a concentration of 0.5 wt % in the solution was weighed out separately into a vial, dissolved in a minimal amount of deionized water, and added to the clay/water/Cymel®/d-mannitol solution. The solution was stirred until homogeneous. Films were coated within one hour of the addition of boric acid to the solution.

Mylar® 92D film samples were coated with this formulation as described above. Samples were cured at 80, 100, and 120° C., and the time required for the samples to become water-resistant, i.e., for curing to be complete, was determined as above. Results are summarized in Table 1. While this formulation requires a somewhat longer cure time at 80° C. than did the formulation in Example 2 (1% boric acid), i.e., 30 versus 25 minutes, it required only 1.5 min. at 100° C. versus 5 min. for the 1% boric acid formulation.

TABLE 1

| Example | Formulation* | Curing Temp., ° C. | Cure Time, min. |
|---|---|---|---|
| 1 (Comp.) | 5 clay/5 Cymel | 150 | 10 |
| 1 (Comp.) | 5 clay/5 Cymel | 178 | 5 |
| 1 (Comp.) | 5 clay/5 Cymel | 200 | 3 |
| 2 | 5 clay/4 Cymel/1 BA | 80 | 25 |
| 2 | 5 clay/4 Cymel/1 BA | 100 | 5 |
| 3 | 5 clay/3.5 Cymel/1.5 BA | 80 | 22 |
| 3 | 5 clay/3.5 Cymel/1.5 BA | 100 | 2 |
| 4 | 5 clay/4 Cymel/0.5 BA/0.5 M | 80 | 30 |
| 4 | 5 clay/4 Cymel/0.5 BA/0.5 M | 100 | 1.5 |
| 4 | 5 clay/4 Cymel/0.5 BA/0.5 M | 120 | 0.5 |

*Cymel is Cymel ® 385, BA is boric acid, and M is d-mannitol

Example 5

Comparative

An aqueous slurry that was 5% montmorillonite clay by weight and 5% Cymel® 385 by weight was prepared and coated onto Mylar® 92D film as described in Example 1(Comparative), except that it was cured by heating for 15 minutes at 65° C. The Oxygen Transport Rate (OTR) of the coated film samples was measured at 23.5° C. at 50% relative humidity (RH) and at 80% relative humidity. Results are shown in Table 2. The ratio of the 80% RH OTR to the 50% RH OTR was 122, illustrating how the barrier degraded as humidity increased.

Example 6

An aqueous slurry that was 5% montmorillonite clay by weight, 4% Cymel® 385 by weight, 0.5% boric acid by weight, and 0.5% d-mannitol by weight was prepared and coated onto Mylar® 92D film as described in Example 4, except that it was cured by heating for 25 minutes at 100° C. The Oxygen Transport Rate (OTR) was measured at 23.5° C. at 50% relative humidity (RH) and at 80% relative humidity: Results are shown in Table 2. The ratio of the 80% RH OTR to the 50% RH OTR was 1.47, illustrating how much less the barrier degraded at increased humidity in comparison with the coating in Example 5 (Comparative) that did not contain boric acid and mannitol.

Example 7

An aqueous slurry that was 5% montmorillonite clay by weight, 4% Cymel® 385 by weight, 0.5% boric acid by weight, and 0.5% d-mannitol by weight was prepared and coated onto Mylar® 92D film as described in Example 4, except that it was cured by heating for 20 minutes at 120° C. The Oxygen Transport Rate (OTR) was measured at 23.5° C. at 50% relative humidity (RH) and at 80% relative humidity. Results are shown in Table 2. The ratio of the 80% RH OTR to the 50% RH OTR was 2.65, illustrating how much less the barrier degraded at increased humidity in comparison with the coating in Example 5 (Comparative) that contained neither boric acid nor mannitol. Additional OTR measurements at different humidities were made at 30° C. on films coated with the same composition and also films cured for 20 minutes at 150 or 180° C. OTR is higher at 30 than at 23.5° C., as expected, but the increase can be lessened by curing at a higher temperature. For example, OTR values measured at 30° C. for the films cured at 150° C. at 80% and 90% RH are respectively 0.00235 and 0.0196 cm$^3$/100 sq. inch-day-atm (0.0364 and 0.304 cm$^3$/m$^2$-day-atm). Those data are included in Table 3.

Example 8

An aqueous slurry that was 5% montmorillonite clay by weight, 4% Cymel® 385 by weight, 0.5% boric acid by weight, and 0.5% d-mannitol by weight was prepared and coated onto Mylar® 92D film as described in Example 4, except that it was kept at room temperature for two weeks. Water resistance analysis indicated this sample was not cured. The Oxygen Transport Rate (OTR) was measured at 23.5° C. at 50% relative humidity (RH) and at 80% relative humidity. Results are shown in Table 2. The ratio of the 80% RH OTR to the 50% RH OTR was 10, indicating that, even without curing, the barrier degraded at increased humidity to a much smaller degree than the coating in Example 5 (Comparative) that contained neither boric acid nor mannitol.

Example 9

An aqueous slurry that was 5% montmorillonite clay by weight, 4% Cymel® 385 by weight, 0.5% boric acid by weight, and 0.5% d-mannitol by weight was prepared and coated onto Mylar® 92D film as described in Example 4, except that it was cured by heating for 25 minutes at 100° C. The Oxygen Transport Rate (OTR) was measured at 23.5° C. at 50% relative humidity (RH) and at 80% relative humidity. Results are shown in Table 2. The ratio of the 80% RH OTR to the 50% RH OTR was 1.17, illustrating how much less the barrier degraded at increased humidity in comparison with the coating in Example 5 (Comparative) that contained neither boric acid nor mannitol.

Example 10

An aqueous slurry was prepared as in Example 4, except that the concentrations were 5% montmorillonite clay by weight, 4.3% Cymel® 385 by weight, 0.35% boric acid by weight, and 0.35% d-mannitol by weight. This formulation was coated onto Mylar® 92D film as described above, and it was kept at room temperature for two weeks. Water resistance analysis indicated this sample was not cured. The Oxygen Transport Rate (OTR) was measured at 23.5° C. at 50% relative humidity (RH) and at 80% relative humidity. Results are shown in Table 2. The ratio of the 80% RH OTR to the 50% RH OTR was 35, indicating that, even without curing, the barrier degraded at increased humidity to a much smaller degree than the coating in Example 5 (Comparative) that contained neither boric acid nor mannitol.

Example 11

An aqueous slurry that was 5% montmorillonite clay by weight, 4.3% Cymel® 385 by weight, 0.35% boric acid by weight, and 0.35% d-mannitol by weight was prepared and coated onto Mylar® 92D film as described in Example 10, except that it was cured by heating for 30 minutes at 100° C. The Oxygen Transport Rate (OTR) was measured at 23.5° C. at 50% relative humidity (RH) and at 80% relative humidity. Results are shown in Table 2. The ratio of the 80% RH OTR to the 50% RH OTR was 4.7, illustrating how much less the barrier degraded at increased humidity in comparison with the coating in Example 5 (Comparative) that contained neither boric acid nor mannitol.

Example 12

An aqueous slurry was prepared as in Example 4, except that the concentrations were 5% montmorillonite clay by weight, 4.6% Cymele® 385 by weight, 0.2% boric acid by weight, and 0.2% d-mannitol by weight. This formulation was coated onto Mylar® 92D film as described above, except that it was kept at room temperature for two weeks. Water resistance analysis indicated this sample was not cured. The Oxygen Transport Rate (OTR) was measured at 23.5° C. at 50% relative humidity (RH) and at 80% relative humidity. Results are shown in Table 2. The ratio of the 80% RH OTR to the 50% RH OTR was 47, indicating that, even without curing and with only a small amount of boric acid and d-mannitol, the barrier degraded at increased humidity to a much smaller degree than the coating in Example 5 (Comparative) that contained neither boric acid nor mannitol (47 versus 122 times worse at the higher humidity).

Example 13

An aqueous slurry that was 5% montmorillonite clay by weight, 4.6% Cymel® 385 by weight, 0.2% boric acid by weight, and 0.2% d-mannitol by weight was prepared and coated onto Mylar® D film as described in Example 12, except that it was cured by heating for 40 minutes at 100° C. The Oxygen Transport Rate (OTR) was measured at 23.5° C. at 50% relative humidity (RH) and at 80% relative humidity. Results are shown in Table 2. The ratio of the 80% RH OTR to the 50% RH OTR was The ratio of the 80% RH OTR to the 50% RH OTR was 7.5, illustrating how much less the barrier degraded at increased humidity in comparison with the coating in Example 5 (Comparative) that contained neither boric acid nor mannitol.

TABLE 2

| Example | Formulation* | Heat time, temp. | Coating thickness, mil (microns) | OTR** at 50% RH | OTR at 80% RH | 80% RH OTR/50% RH OTR |
|---|---|---|---|---|---|---|
| 5 (Comp.) | 5 clay/5 Cymel | 15 min 65° C. | 0.25 (6.4) | 0.0045 (0.070) | 0.548 (8.49) | 122 |
| 6 | 5 clay/4 Cymel/ 0.5 BA/0.5 M | 25 min 100° C. | 0.4 (10) | 0.0037 (0.057) | 0.00545 (0.0844) | 1.47 |
| 7 | 5 clay/4 Cymel/ 0.5 BA/0.5 M | 20 min 120° C. | 0.4 (10) | 0.0014 (0.022) | 0.0037 (0.057) | 2.65 |
| 8 | 5 clay/4 Cymel/ 0.5 BA/0.5 M | 2 wks, room temp | 0.1 (3) | 0.00129 (0.020) | 0.0129 (0.200) | 10.0 |
| 9 | 5 clay/4 Cymel/ 0.5 BA/0.5 M | 25 min 100° C. | 0.2 (5) | 0.011 (0.17) | 0.0129 (0.200) | 1.17 |
| 10 | 5 clay/4.3 Cymel/ 0.35 BA/0.35 M | 2 wks, room temp | 0.2 (5) | 0.0021 (0.033) | 0.0748 (1.16) | 35 |
| 11 | 5 clay/4.3 Cymel/ 0.35 BA/0.35 M | 30 min., 100° C. | 0.2 (5) | 0.00277 (0.0429) | 0.0129 (0.200) | 4.7 |
| 12 | 5 clay/4.6 Cymel/ 0.2 BA/0.2 M | 2 wks, room temp | 0.2 (5) | 0.00148 (0.0229) | 0.0710 (1.10) | 48 |
| 13 | 5 clay/4.6 Cymel/ 0.2 BA/0.2 M | 40 min 100° C. | 0.3 (5) | 0.0026 (0.040) | 0.0196 (0.304) | 7.5 |

*Cymel is Cymel ® 385, BA is boric acid, and M is d-mannitol
**$cm^3$/100 sq. in.-day-atm ($cm^3/m^2$-day-atm) at 23.5° C.

TABLE 3

OTR of PET Film, 5 clay/4 Cymel/0.5 BA/0.5 M Coating, Cured at 120° C., 20 min. Coating thickness: 0.4 mil (10 microns).

| RH (%) | OTR at 23.5° C., $cm^3/100$ sq. in.-day-atm, ($cm^3/m^2$-day-atm) | OTR at 30° C., $cm^3/100$ sq. in.-day-atm, ($cm^3/m^2$-day-atm) |
|---|---|---|
| 50 | 0.0014 (0.0217) | 0.0024 (0.037) |
| 70 | — | 0.0055 (0.085) |
| 80 | 0.0037 (0.057) | 0.012* (0.19) |
| 90 | 0.043 (0.67) | 0.28** (4.3) |

*0.0016 (0.025) when cured at 180° C. for 20 minutes, 0.0024 (0.037) when cured at 150° C. for 20 minutes
**0.0196 (0.304) when cured at 150 or 180° C. for 20 minutes Example 14

An aqueous slurry that was 5% montmorillonite clay by weight, 4.6% Cymel® 385 by weight, 0.2% boric acid by weight, and 0.2% d-mannitol by weight was prepared as described in Example 12. Slurry that either had been preheated at 74° C. for six minutes then cooled to ambient temperature or had not been preheated was coated onto Mylar® 92D film as described above. Coated film samples were cured at 100 or 120° C. Cure times, that is, times for the coating to become moisture resistant, are presented in Table 4, illustrating the dramatic decrease in cure time that resulted when the slurry was preheated.

TABLE 4*

| Preheated, 74° C., 6 min. | Cure Temperature, ° C. | Cure Time, minutes |
|---|---|---|
| No | 100 | 35 |
| Yes | 100 | 10 |
| No | 120 | 10 |
| Yes | 120 | 3 |

*Formulation: 5 montmorillonite clay/4.6 Cymel ® 385/0.2 boric acid/0.2 d-mannitol by weight Example 15

An aqueous slurry containing 5% montmorillonite clay by weight, 4% Cymel® 385 by weight, 0.5% boric acid by weight, and 0.5% d-mannitol by weight was prepared as in Example 4 and then preheated for six minutes at 75° C. There was no appreciable change in its viscosity. The slurry was cooled to room temperature and coated onto Mylar® 92D film as described above. Coating quality was excellent. Cure times at 80° C. and at room temperature were determined. The cure time at 80° C. was 15 minutes, versus 30 minutes for the same composition that had not been preheated (Example 4). At room temperature, the coating was cured in three days, a vast improvement over the same composition without preheating, which remained uncured after two weeks at room temperature (Example 8).

Example 16

An aqueous slurry that was 5% montmorillonite clay by weight, 4% Cymel® 385 by weight, 0.5% boric acid by weight, and 0.5% d-mannitol by weight was prepared and coated onto Mylar® 92D film as described in Example 4. Samples were then exposed to UV/NIR radiation from an EPIQ 6000 Irradiator, Model 6000 UV lamp equipped with an "H-plus" bulb and regular reflector and then tested for water resistance. The coating became water resistant in 10 seconds at 50% power (944 Watts) and in 30 seconds at 35% power (661 Watts). The Oxygen Transport Rate (OTR) of a film cured in 30 seconds at 35% power, with a coating thickness of 0.1 mil (3 microns), was determined to be 0.132 $cm^3/m^2$-day (0.0085 $cm^3/100$ sq. in.-day-atm) at 23.5° C. and 50% relative humidity (RH) and 0.135 $cm^3/m^2$-day (0.0087 $cm^3/100$ sq. in.-day-atm) at 80% relative humidity. Thus, the ratio of the 80% RH OTR to the 50% RH OTR was 1.02. The performance was very similar to that of an unirradiated sample of the same composition cured at 100° C. for 25 minutes (Example 9).

Examples 17–24

540-ml PET bottles were spray coated with an aqueous slurry that was 5% montmorillonite clay by weight, 4% Cymel® 385 by weight, 0.5% boric acid by weight, and 0.5% d-mannitol by weight (formulation "BAM") or one that was 5% montmorillonite clay by weight, 4% Cymel® 385 by weight and 1% boric acid by weight (formulation "BA"). The bottles were coated using a modified Automatic Test Panel Spray Machine from Spraymation, Inc. (Ft. Lauderdale, Fla.) as described above. All PET bottles were flame treated before the application of the barrier coating. The bottles were coated within 6 h after the flame treatment. After applying the barrier coat, the bottles from Example 17, 18, 20, 22, 23 and 24 were dried in a drying oven at 65° C. for 5 min while Example 19 and 21 were air dried over a period of ~30 min. The bottles were subsequently coated with Chromaclear® Ultra Productive Urethane clear coat using the same spray parameters as described above. All bottles were clear coated. Rotating bottles were exposed to UV/NIR radiation as indicated in Table 4 below. In Examples 17, 19, 20, 21, and 22, the bottles were exposed to UV/NIR radiation before the clear coat was applied ("before cc" in Table 4). The bottles were exposed to the UV/NIR radiation 24 h after the base coat application. The clear coat was applied 24 h after the radiation experiments. In Examples 18, 23, and 24, they were exposed to UV/NIR radiation after the clear coat was applied ("after cc" in Table 4). Both coatings of these bottles were applied within a 10 h period. In Examples 18, 19, and 20, the bottles were exposed for 15 seconds, allowed to cool down, and then exposed again for 10 seconds. OTR's were measured on the bottles and compared to the OTR of an uncoated PET control bottle, which was 0.175 $cm^3$/package-day at 25° C., 92% RH. The barrier improvement factor, X, is defined as the control bottle OTR, 0.175, divided by the OTR of the treated bottle.

Results are given in Table 5. The combination of short-time exposed to UV/NIR radiation and the boric-acid-containing formulations, with and without mannitol, produced bottles with 6.3 to 22× improvement in barrier over the uncoated PET bottle control.

TABLE 5

| Example | Formulation | Exposure Conditions** | OTR* | X (=0.175/OTR) |
|---|---|---|---|---|
| 17 | BAM | Before cc, 105 sec at 35% power. | 0.0078 | 22 |
| 18 | BA, air dried base coat | After cc, 15 sec at 50% power, cool down, 10 more sec at 50% power. | 0.0093 | 19 |

TABLE 5-continued

| Example | Formulation | Exposure Conditions** | OTR* | X (=0.175/ OTR) |
|---|---|---|---|---|
| 19 | BAM, air dried base coat | After cc, 15 sec at 50% power, cool down, 10 more sec at 50% power. | 0.017 | 10 |
| 20 | BAM | After cc, 15 sec at 50% power, cool down, 10 more sec at 50% power. | 0.020 | 8.8 |
| 21 | BA, air dried base coat | Before cc, 105 sec at 35% power. | 0.019 | 9.2 |
| 22 | BA | Before cc, 105 sec at 35% power. | 0.0071 | 25 |
| 23 | BAM, air dried base coat | After cc, 105 sec at 35% power. | 0.028 | 6.3 |
| 24 | BAM | After cc, 105 sec at 35% power. | 0.013 | 14 |

*$cm^3$/package-day at 25° C., 92% RH.
**Example 17: "H-plus" bulb with regular reflector. 35% power = 661 Watts. Examples 18 through 24: "H-plus" bulb with dichroic reflector. 35% power = 320 Watts, 50% power = 457 Watts.
cc: clear coat.

Example 25

An aqueous slurry that was 3.5% montmorillonite clay by weight, 4% water soluble nylon (made from 100 molar parts adipic acid, 50 molar parts hexamethylenediamine, and 50 molar parts hexamethylene triethylene glycol diamine) by weight, 1.5% Cymel® 385 by weight, 0.5% boric acid by weight, and 0.5% d-mannitol by weight was prepared and coated onto Mylar® D film as described in Example 4; the nylon was added along with the Cymel®. Samples were cured at 120° C. for 20 minutes. The OTR measured at 23.5° C. and 80% RH was 0.11 $cm^3$/100 sq. inch /day. Addition of nylon also enhanced the flexibility of the coatings.

Example 26

Mylar® 50M34N, a 1-mil (25 micron) PET film coated on one side with polyvinylidene chloride (PVDC), obtained from DuPont Teijin Films (Hopewell, Va.), was coated on the PET side, in the manner described above, with a slurry that was 5% montmorillonite clay by weight, 4% Cymel® 385 by weight, 0.5% boric acid by weight, and 0.5% d-mannitol by weight ("BAM coating"). It was allowed to dry at room temperature. A PVDC/PET/clay slurry/PET/PVDC film laminate was then prepared by pressing together two pieces of coated Mylar® 50M34N film, with the clay coatings in contact, at 120° C. and 10,000 psi (69 MPa) for 5 minutes. The resulting laminated film was visually clear (Sample 26A). For comparison, a sample of Mylar® 50M34N film was also heated at 120° C. for 5 minutes (Sample 26B). Barrier properties of the laminated film and the individual components are presented in Table 6.

TABLE 6

| Composition | WVTR g-mil/100 $in^2$-day-atm (g-mm/$m^2$-day-atm) 40° C., 100% RH | OTR $cm^3$-mil/100 $in^2$-day-atm ($cm^3$-mm/$m^2$-day-atm) 23° C., 80% RH |
|---|---|---|
| Mylar® 92D PET | 1.99 (0.783) | 5.0 (2.0) |
| Mylar® 50M34N | 0.60 (0.24) | 0.20 (0.079) |
| Mylar® 92D PET with BAM coating | 1.57 (0.618) | 0.0037 (0.0015) |
| Mylar® 50M34N heated at 120° C. | 0.50 (0.197) | 0.20 (0.079) |
| PVDC/PET/clay slurry/PET/PVDC Laminate | 0.55 (0.217) | 0.0027 (0.0011) |

Example 27

This example demonstrates the feasibility of coating bottle interiors using the formulations of the present invention. A 540 ml PET bottle was filled with 100 ml of a slurry that was 5% montmorillonite clay by weight, 4% Cymel® 385 by weight, 0.5% boric acid by weight, and 0.5% d-mannitol by weight, prepared as described above. The content of the bottle was slowly removed by slow pouring while rotating the bottle. The resulting coating was dried at 60° C. for 30 minutes. The coating was uniform. The bottle became slightly hazy upon drying; the degree of haze was small enough that applying a clear coat layer could essentially eliminate the haze and restore transparence.

What is claimed is:

1. A high-barrier, moisture-insensitive coating containing at least 2% by weight solids in water, wherein the solids portion of the composition comprises:
   a. from 25 to 55% by weight, a nonpolymeric organic binder comprising at least one member selected from the group consisting of melamine, formaldehyde, derivatives of melamine, and derivatives of formaldehyde, where such derivatives are capable of chelation with boric acid;
   b. optionally, a water-soluble or water dispersible organic binder, selected from the group consisting of
      i) polysaccharides and cellulosic materials selected from cellulose, hydroxymethyl cellulose, carboxymethyl cellulose, amylose, pluran, starch, and hydroxyethyl cellulose;
      ii) water-soluble ethylene-vinyl alcohol (EVOH) copolymers;
      iii) water-soluble polyamides;
      iv) melamine formaldehyde resin;
      v) polyethylene glycol; and
      vi) blends thereof;
   c. from 10% up to 70% by weight, based on the dry weight of the first coating layer, an inorganic laminar mineral selected from the group consisting of montmorillonite, laponite, organo-modified montmorillonite and mixtures thereof;
   d. from 2 to 12% by weight, based on the dry weight of the first coating layer, boric acid; and
   e. from 0 to 6% by weight, based on the dry weight of the first coating layer, of a hydroxyl-containing species, other than poly(vinyl alcohol), that has two hydroxyl groups on one side of the molecule with which the boric acid can form a chelate.

2. The coating composition of claim 1, wherein the nonpolymeric organic binder is made from melamine and formaldehyde.

3. The coating composition of claim 1, wherein the ratio of boric acid to hydroxyl-containing species is 1:1.

4. The coating composition of claim 1 wherein the hydroxyl containing species is d-mannitol.

5. The coating composition of claim 1 wherein the nonpolymeric organic binder is made from melamine and formaldehyde, the ratio of boric acid to hydroxyl-containing species is 1:1, and the hydroxyl containing species is d-mannitol.

6. The coating composition of claim 1 comprising
   a. a montmorillonite clay;
   b. a nonpolymeric organic binder made from melamine and formaldehyde;
   c. boric acid; and
   d. d-mannitol,
wherein the ratio of a:b:c:d is 5:4:0.5:0.5 by weight.

7. The coating composition of claim 1, wherein the optional water-soluble or water dispersible organic binder is present and such binder is selected from the group consisting of
   i) polysaccharides and cellulosic materials selected from cellulose, hydroxymethyl cellulose, carboxymethyl cellulose, amylose, pluran, starch, and hydroxyethyl cellulose;
   ii) water-soluble ethylene-vinyl alcohol (EVOH) copolymers;
   iii) water-soluble polyamides;
   iv) melamine formaldehyde resin;
   v) polyethylene glycol; and
   vi) blends thereof.

8. A polymeric substrate coated with a coating comprising the coating composition of claim 1.

9. The polymeric substrate of claim 8 in the form of a film, sheet, or tubing.

10. A polymeric container which comprises:
    a. a polymeric substrate shaped to define a container;
    b. a first coating layer adhered to at least one surface of the polymeric substrate and capable of retarding the transmission of oxygen, water vapor, and carbon dioxide through the substrate, said first coating layer comprising the composition of claim 1; and
    c. an optional clear coat layer adhered to the first coating layer, said clear coat layer comprising a curable composition comprising a binder component in an organic solvent.

11. The polymeric container of claim 10 which is rigid.

12. The polymeric container of claim 10 which is a bottle.

13. The polymeric container of claim 12 which is a biaxially oriented poly(ethylene terephthalate) bottle.

14. The polymeric container of claim 11 which is a can.

15. The can of claim 14 which is a plastic aerosol can.

16. The can of claim 14 which is a plastic coffee can.

17. A laminate comprising at least two layers, at least one of which comprises the coating composition of claim 1.

18. The laminate of claim 17 which comprises at least three layers, wherein at least one inner layer comprises the coating composition of claim 1 and at least one outer layer comprises a heat sealable polymer film.

19. The laminate of claim 18 comprising the sequential layers:
    a. poly(vinylidene chloride);
    b. poly(ethylene terephthalate);
    c. the coating composition of claim 1;
    d. poly(ethylene terephthalate); and
    e. poly(vinylidene chloride).

20. The laminate of claim 18 comprising the sequential layers:
    a. poly(vinylidene chloride);
    b. poly(ethylene terephthalate);
    c. the coating composition of claim 6;
    d. poly(ethylene terephthalate); and
    e. poly(vinylidene chloride).

21. A display device comprising the laminate of claim 17.

22. A time or temperature-time indicating device comprising an indicating material sealed inside a polymeric package comprising the laminate of claim 18, wherein the color of the indicator changes the presence of a substance that continuously permeates into the package.

23. The indicating device of claim 22 wherein the substance that continuously permeates into the package is oxygen or water vapor.

24. A method for decreasing the permeability of a polymeric substrate, comprising the steps of:
    a. forming the polymeric substrate;
    b. optionally, heating the polymeric substrate surface before applying a first coating layer;
    c. optionally, preheating an aqueous composition that will be used to form said first coating layer;
    d. applying to at least one surface of the polymeric substrate said first coating layer having a thickness in the range of 8 microns or less by spraying or dip coating onto the polymeric substrate, said aqueous composition comprising the coating composition of claim 1;
    e. drying the first coating layer at ambient or slightly elevated temperature;
    f. curing the first coating layer at a temperature below the temperature at which heat distortion of the polymeric substrate can occur; and
    g. optionally, applying to the first coating layer a second, clear coat layer having a thickness in the range of about 12 microns or less by spraying onto said first coating layer a curable composition comprising (a) a binder component and (b) an organic solvent; and curing said second coating layer.

25. The method of claim 24 wherein the aqueous composition of step (c) is preheated at 75 to 90° C. for 5 to 15 minutes.

26. The method of claim 24 wherein curing step (f) is carried out by exposing the coating layer to UV/NIR radiation.

27. The method of claim 26 wherein curing step (f) is carried out after the clear coat layer is applied in step (g).

28. The method of claim 24 wherein the polymeric substrate is in the form of a film, sheet, bottle, container, or tubing.

\* \* \* \* \*